United States Patent
Van Dijk

(10) Patent No.: US 12,279,598 B2
(45) Date of Patent: Apr. 22, 2025

(54) FEED-PROCESSING SYSTEM

(71) Applicant: LELY PATENT N.V., Maassluis (NL)

(72) Inventor: Samuel Van Dijk, Maassluis (NL)

(73) Assignee: LELY PATENT N.V., Maassluis (NL)

(*) Notice: Subject to any disclaimer, the term of this patent is extended or adjusted under 35 U.S.C. 154(b) by 109 days.

(21) Appl. No.: 17/615,929

(22) PCT Filed: Jun. 19, 2020

(86) PCT No.: PCT/NL2020/050394
§ 371 (c)(1),
(2) Date: Dec. 2, 2021

(87) PCT Pub. No.: WO2020/263080
PCT Pub. Date: Dec. 30, 2020

(65) Prior Publication Data
US 2022/0312726 A1  Oct. 6, 2022

(30) Foreign Application Priority Data
Jun. 26, 2019 (NL) .................................... 2023391

(51) Int. Cl.
*A01K 5/02* (2006.01)
*A01D 90/04* (2006.01)

(52) U.S. Cl.
CPC ............. *A01K 5/02* (2013.01); *A01D 90/04* (2013.01); *A01K 5/0208* (2013.01)

(58) Field of Classification Search
CPC ...... A01K 5/02; A01K 5/0275; A01K 5/0208; A01D 90/02; A01D 90/04

(Continued)

(56) References Cited

U.S. PATENT DOCUMENTS 4,981,107 A * 1/1991 Beaudoin ............. A01K 5/0208
119/56.2
5,813,616 A * 9/1998 Vandervalk ............ A01F 29/005
241/101.76

(Continued)

FOREIGN PATENT DOCUMENTS

DE    40 06 236 A1    8/1991
DE    19612053 A1 * 10/1997  ........... A01D 43/077

(Continued)

OTHER PUBLICATIONS

International Search Report, issued in PCT/NL2020/050394, dated Sep. 16, 2020.

(Continued)

*Primary Examiner* — Timothy D Collins
*Assistant Examiner* — Maria E Graber
(74) *Attorney, Agent, or Firm* — Birch, Stewart, Kolasch & Birch, LLP

(57) ABSTRACT

An animal feedstuff processing system for processing animal feedstuff includes an animal feedstuff storage device for storing a pile of animal feedstuff, a separating device for removing a quantity of feedstuff from the pile and including a rotatable separating element and a first drive for the separating element, a movement device with a second drive, and configured for moving the separating device and the pile of feedstuff towards each other. A sensor is arranged for determining a relative position of the separating element with respect to the pile of feedstuff. A controller is configured to control the animal feedstuff processing system. During at least a part of the movement of the separating device and the pile of feedstuff towards each other, the separating device is driven in an idle mode by the first drive, wherein the separating element has no operable contact with the pile of feedstuff. The sensor measures a sensor signal representative of an operating parameter of the first drive, (Continued)

Figure 1:
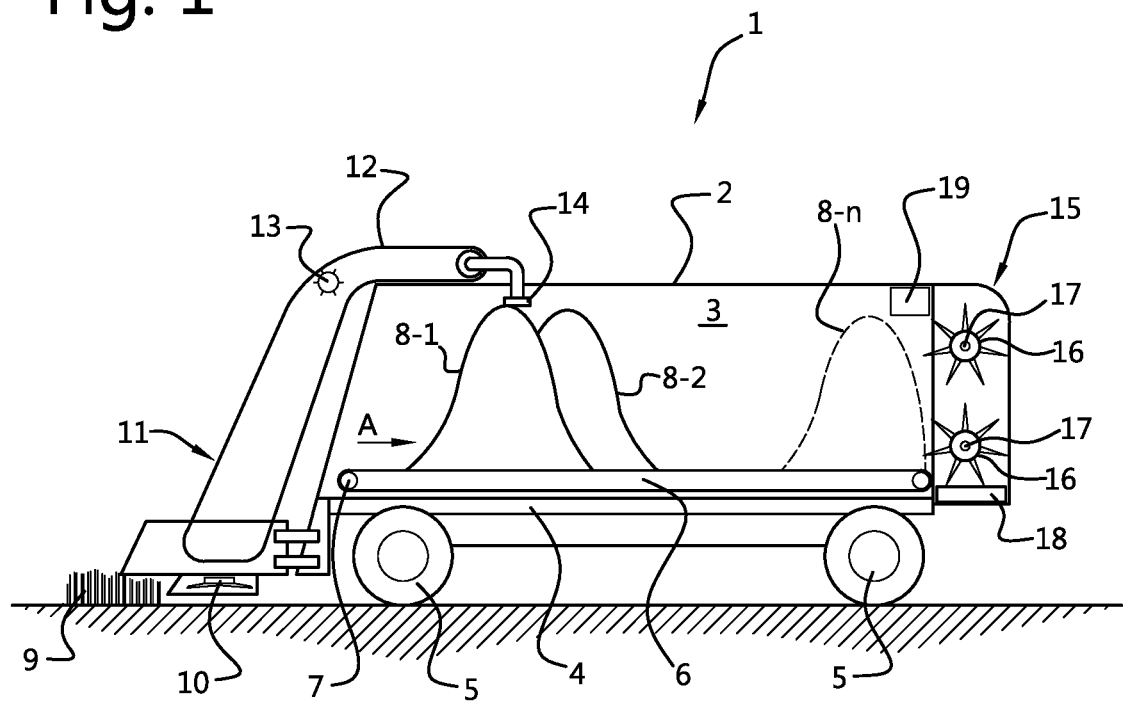

and the controller is configured to determine contact between the separating element and the pile of feedstuff based on the sensor signal. The animal feedstuff processing system is controlled on the basis of the determined contact.

16 Claims, 2 Drawing Sheets

(58) Field of Classification Search
USPC .................................................. 119/57.92
See application file for complete search history.

(56) References Cited

U.S. PATENT DOCUMENTS

| | | | | |
|---|---|---|---|---|
| 6,431,480 | B1 * | 8/2002 | Hruska | A01F 29/005 |
| | | | | 241/101.76 |
| 6,572,039 | B1 * | 6/2003 | Kruer | A01K 5/005 |
| | | | | 241/101.76 |
| 6,896,215 | B2 * | 5/2005 | Lucas | A01K 5/005 |
| | | | | 241/189.1 |
| 10,401,867 | B2 * | 9/2019 | Strautmann | G05D 1/024 |
| 10,736,271 | B2 * | 8/2020 | Johnson | A01D 90/02 |
| 11,310,963 | B2 * | 4/2022 | Burnley | G05D 1/02 |
| 2007/0290087 | A1 * | 12/2007 | Weiss | B02C 19/00 |
| | | | | 241/101.76 |
| 2010/0219275 | A1 * | 9/2010 | Weiss | A01K 5/005 |
| | | | | 241/101.76 |
| 2010/0332051 | A1 * | 12/2010 | Kormann | A01F 12/46 |
| | | | | 701/2 |
| 2013/0213518 | A1 * | 8/2013 | Bonefas | A01D 75/00 |
| | | | | 141/94 |
| 2017/0049036 | A1 * | 2/2017 | Tvetene | A01B 76/00 |
| 2017/0118914 | A1 * | 5/2017 | Bruns | A01D 90/10 |
| 2017/0202177 | A1 | 7/2017 | Loosveld | |
| 2019/0053427 | A1 * | 2/2019 | Matway | A01D 43/086 |
| 2019/0124848 | A1 * | 5/2019 | Johnson | A01D 90/10 |

FOREIGN PATENT DOCUMENTS

| | | | | |
|---|---|---|---|---|
| DE | 102008002006 A1 * | 12/2009 | | A01D 43/073 |
| DE | 10 2009 042 243 A1 | 3/2011 | | |
| DE | 102010038661 A1 * | 2/2012 | | A01B 69/008 |
| DE | 102012112154 A1 * | 6/2014 | | A01D 90/04 |
| DE | 102013107757 A1 * | 1/2015 | | A01D 90/04 |
| DE | 102017113241 A1 * | 12/2018 | | A01D 90/10 |
| EP | 0670107 A1 * | 2/1995 | | |
| EP | 1982574 A1 * | 10/2008 | | A01D 90/02 |
| EP | 3 427 569 A1 | 1/2019 | | |
| FR | 2618047 A1 * | 1/1989 | | |
| GB | 905116 | 9/1962 | | |
| WO | WO-9614735 A1 * | 5/1996 | | A01F 25/2027 |
| WO | WO 2015/152810 A1 | 10/2015 | | |

OTHER PUBLICATIONS

Written Opinion of the International Searching Authority, issued in PCT/NL2020/050394, dated Sep. 16, 2020.

* cited by examiner

FEED-PROCESSING SYSTEM

The present invention relates to a feed-processing system for processing animal feed, comprising a feed-storage device for storing a pile of animal feed, a removing device, such as a defacer or unloading roller, for releasing an amount of animal feed from the pile of animal feed in the feed storage device, and comprising a rotatable removing member and a first drive for the removing member, a displacement device with a second drive, and configured to move the removing device and the pile of animal feed towards each other, a sensor for detecting a sensor signal which indicates a relative position of the removing member of the removing device with respect to the pile of animal feed, and a control unit configured to control the feed-processing system, in particular the removing device and the displacement device.

Document WO2015/152810A1 discloses such a system comprising a holder for roughage, a transport belt for transporting animal feed into the holder, a feed separator for separating roughage from the roughage in the holder, and a feed sensor for emitting a feed presence or absence signal. A control unit controls the transport belt on the basis of the signal from the sensor.

Although nothing at all is disclosed about the design of this sensor, it is a drawback of such a device that it does not always work reliably, because the sensor may emit an unclear or incorrect signal, in particular with relatively loose roughage. In addition, the sensor is susceptible to wear and malfunction due to the often soiled, dusty environment, and the system as a whole is unnecessarily complicated.

It is an object of the present invention to provide a feed-processing system of the abovementioned kind, which is simpler and/or more reliable, at least prevents the above drawbacks.

The invention achieves this object by means of a feed-processing system according to claim 1, in particular a feed-processing system for processing animal feed, comprising a feed storage device for storing a pile of animal feed, a removing device, such as a defacer or unloading roller, for releasing an amount of animal feed from the pile of animal feed in the feed storage device, and comprising a rotatable removing member and a first drive for the removing member, a displacement device with a second drive, and configured to move the removing device and the pile of animal feed towards each other, a sensor for detecting a sensor signal which indicates a relative position of the removing member of the removing device with respect to the pile of animal feed, and a control unit configured to control the feed-processing system, in particular the removing device and the displacement device, wherein the control unit is configured to cause the first drive to drive the removing member in a freewheeling mode during at least a part of the movement of the removing device and the pile of animal feed towards each other, wherein the removing member is not in any operative contact with the pile of animal feed, wherein the sensor measures a sensor signal relating to an operating parameter of the first drive, and wherein the control unit is configured to detect whether the removing member and the pile of animal feed are in contact on the basis of the sensor signal, and wherein the control unit is configured to control the feed-processing system, partly on the basis of whether or not contact was detected.

The invention is based on the idea that the control unit of the drive for the removing device may also serve as a feed detection sensor. After all, in many cases, the removing device already has to be controlled and one or more sensors for determining a value for one or more associated operating parameters are already present. Now, the overall construction can be simpler and/or more reliable by the fact that a separate sensor is no longer necessary and/or that the sensor for the operating parameter actually measures when the feed influences the removing device. The value of the operating parameter, or the change therein, which is then measured, can then indicate more reliably whether or not feed is present. After all, a single protruding small blade of feed will not have any influence on the removing device, whereas the large pile itself will. Thus, a more reliable detection of the presence of feed at the removing device is ensured.

Particular embodiments are described in the dependent claims, and in the following part of the introduction of the description.

In embodiments, the control unit is configured to detect contact if the operating parameter reaches or exceeds a predetermined contact threshold value. The removing member may be driven at low power, low torque, low rotary speed etc. in the freewheeling mode. When the animal feed and the removing member have approached each other to such an extent that the animal feed has a detectable effect on the removing member, the value of the operating parameter will change. For example, the rotary speed may drop while the power/torque/current/pressure remain the same, or the required power/torque/current/pressure in order to maintain a certain rotary speed increase. Other changes are also possible. This change depends on the type of removing member, the drive, the type of animal feed and then quality thereof and also, for example, on the penetration depth of the removing member in the animal feed. The first two factors are in principle constant, but the latter two may vary, such as with regard to moisture content, compactness, composition, etc. On the basis of knowledge about the animal feed in terms of type and quality, the user and/or the feed-processing system may select and set a contact threshold value. The contact threshold value may then, for example, be associated with a real contact distance at which the removing member can actually start to remove/separate animal feed from the pile of animal feed. As has already been mentioned, this contact distance/penetration depth may vary depending on the type of removing member, drive and animal feed.

Incidentally, it should be noted here that the expression "freewheeling mode, in which the removing member is not in operative contact with the pile of animal feed" is understood to mean that the removing member moves, such as rotates, without effectively touching the animal feed, but that the freewheeling mode in principle ends when the control unit detects there is contact. Obviously, the removing device can then still be driven, but this is then a type of hybrid mode, in which the operating parameter(s) can change, on account of the contact. Whether or not animal feed is removed depends on the subsequent settings of the system.

In particular, the first drive comprises an electric motor or a hydraulic drive. These drives are highly suitable for accurately controlling the drive device, but it is also possible to measure a (relevant) operating parameter in a very simple manner. In embodiments, the operating parameter comprises a consumed current or power, a rotary speed or a produced torque. However, other drives are not excluded.

In embodiments, said control of the feed-processing system comprises the control, in particular stopping, of the second drive when the control unit detects said contact. In this case, the freewheeling mode then ends by bringing the removing member to a standstill. This is useful, for example, if it is not yet necessary to release/remove animal feed from the pile of animal feed at that point in time. For example, it is sufficient at that point in time if the pile of animal feed is ready to be removed later by the removing device at a desired point in time.

Alternatively or additionally, said control of the feed-processing system comprises causing the first drive to drive the removing member in a removing mode when the control unit has detected said contact, wherein the removing member releases animal feed and removes it from the pile of animal feed, and wherein the first drive operates at a higher rotary speed and/or power than in the freewheeling mode. In this case, the control unit starts removing animal feed from the pile of animal feed. Due to the detected contact, this can take place in a reliable manner.

In particular, the control unit controls the first drive in the removing mode by means of said sensor signal and another sensor signal, respectively, relating to said operating parameter and another operating parameter, respectively. Using this measure, which is known per se, the control unit can accurately actuate the removing device, for example with regard to the speed of removal or the amount. In this case, it is possible to use a different operating parameter than the one which was used to determine contact. It is also possible to control the system in another way, such as by means of an optional drive or provided peripheral equipment, which will be explained in greater detail below.

In embodiments, the feed storage device comprises a storage floor, in particular in a holder, in a fixed position with respect to the outside world. This is understood to mean that, in use, at least the pile of animal feed is situated on a storage floor which is fixed with respect to the outside world, such as for example in what is referred to as a feed kitchen. In this case, the storage floor may be provided with one or more side walls, so that a holder is formed in which the storage floor is situated. An example thereof is what is referred to as a pit for silage.

In particular, the removing device is fixedly arranged and the displacement device is configured to move the pile of animal feed in the feed storage device towards the removing device. In particular, the displacement device comprises a movable loading floor or a floor chain. In this case, the animal feed is thus displaced towards the removing device. Important examples are, for example, systems in which a bale of feed is conveyed to a cutter/scraper, such as in the Triomatic system produced by Trioliet. Forage boxes and/or loader wagons are provided with a system for displacing the loaded animal feed, such as by means of a conveyor belt or floor chain which moves along the floor and thus carries feed along. Said prior-art document also mentions a holder having a storage floor with a feed-entrainment device thereon which can take the pile of animal feed to a removing device.

Alternatively or additionally, the removing device comprises a displaceable vehicle which carries the removing member. In this case, the removing member, or even the entire removing device, is situated on said vehicle and that vehicle can be moved to the pile of animal feed in order there to remove animal feed from the pile of animal feed after contact has been detected. Examples of such measures are, for example, silage defacers. Also with these embodiments, it is advantageous if the control unit is able to detect when contact has been made. The vehicle may be embodied as a moving vehicle, that is to say displaceable across a floor surface, or also suspended from a rail, or even as a device moved along by tractor.

In embodiments, the feed-processing system comprises a vehicle on which both the feed storage device and the removing device are provided. This results in a single vehicle which in principle comprises both functions, namely moving, and thus supplying, the pile of animal feed and removing animal feed from this pile of animal feed by means of the removing device. Since it is one vehicle, the combination can be moved to a suitable location, for example for loading the vehicle with the desired animal feed. Other embodiments and advantages will also be discussed in more detail below.

In particular, the vehicle is autonomously self-propelled. This means that the control unit, or a part thereof, is capable of taking the vehicle autonomously to one or more destinations. To this end, the system may furthermore be equipped with additional devices, such as a location-detecting system, such as a GPS system or a local system based on beacons, and with a navigation and/or steering device. Autonomous, self-propelled vehicles are known per se, so the reader is referred to the prior art for further technical details. However, it will be clear that an autonomous vehicle which combines one or more of the functions described, such as "moving a pile of animal feed to the removing device" and/or "removing animal feed from the pile of animal feed", may be a particularly useful additions in livestock farming, since hard labour can now be performed automatically.

In embodiments, the feed-processing system furthermore comprises a cutting device for cutting plants on the field, and a gathering device for gathering the cut plants and passing them to the feed storage device. By means of such a measure, the system itself can collect animal feed by cutting and gathering it. This measure is in itself known from a loader wagon. However, is is advantageous that the further processing, such as suitable processing and controlled and reliable removal of animal feed from the pile of collected animal feed, can take place automatically.

In particular, the feed-processing system furthermore comprises a dosing device for dosing out the feed and/or the cut plants to animals. This measure is also known per se, such as from automatic feed systems, for example the Lely Vector® system. But the combination of a dosing device with a feed storage device and a removing device, and in particular with an optional cutting and gathering device, provides an optimum system to automatically provide cattle with fresh roughage. The vehicle is able to drive autonomously and can in addition cut and gather grass, or another plant, such as alfalfa, and, if desired, compress it to a greater or lesser degree. The vehicle is furthermore able to drive and can thus take the pile of animal feed to a location where some of the pile of animal feed can be removed using the removing device, and can be dispensed by means of the dosing device, such as in particular to cattle, but also for example for intermediate storage in a feed kitchen, in order to prepare a mixed ration therewith, etc.

Advantageously, the removing device serves as the dosing device. In this case, both functions are thus combined in one and the same device. For example, in the case of the vehicle with both functions, when removing animal feed, the removing device will simultaneously dose out the removed animal feed. However, it is also possible to keep the functions separate, such as for example by using an intermediate store.

Figure 2:
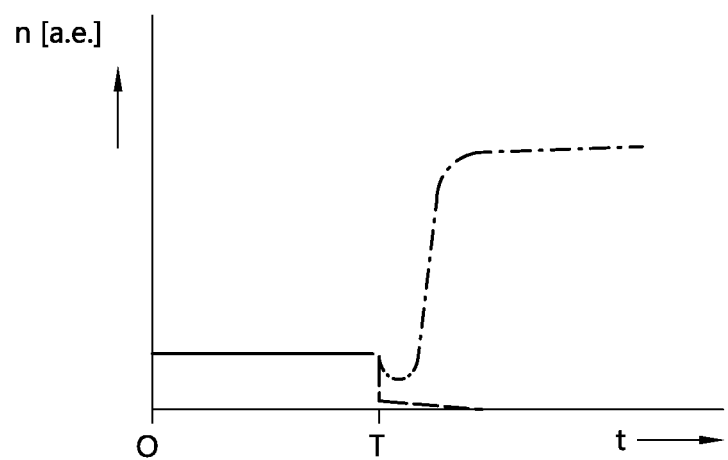
Figure 3:
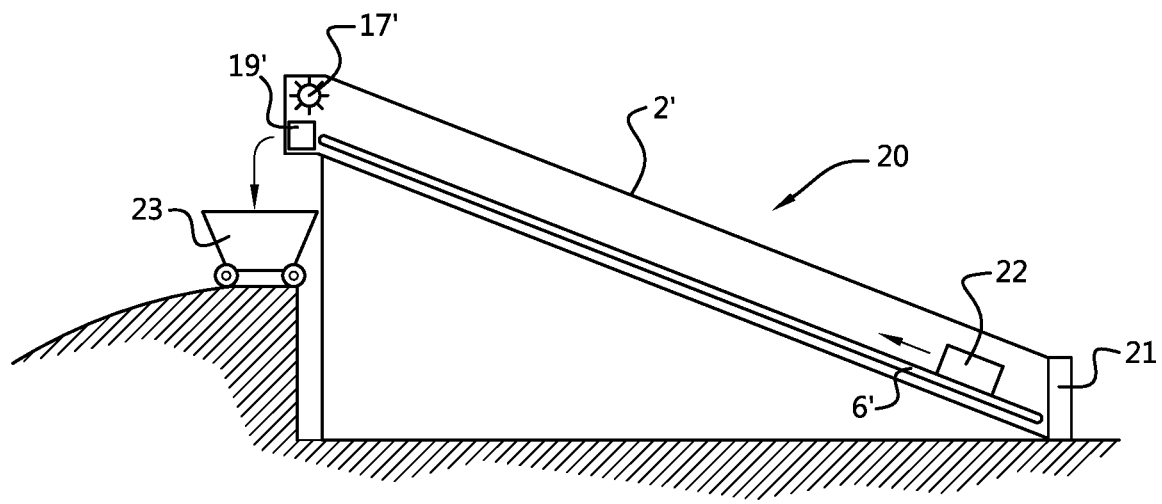
Figure 4:
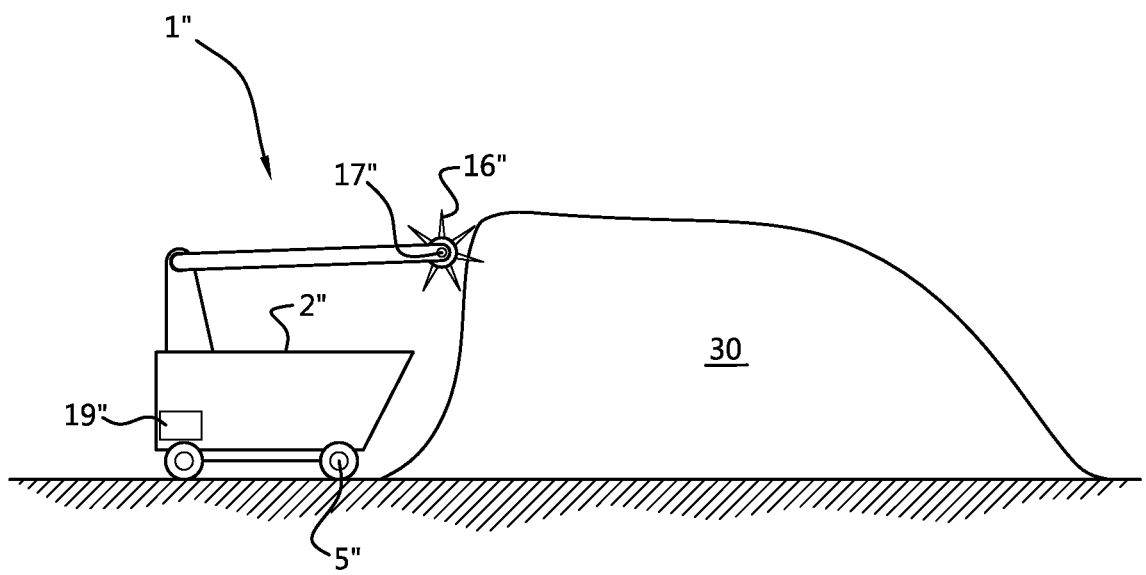

The invention will now be explained in more detail by means of a few exemplary embodiments and the drawing, in which:

FIG. 1 diagrammatically shows a partial cross section of a feed-processing system according to the invention;

FIG. 2 diagrammatically shows an exemplary diagram of the rotary speed as a function of time;

FIG. 3 diagrammatically shows a side view of an alternative feed-processing system according to the invention; and FIG. 4 diagrammatically shows a side view of yet another alternative feed-processing system according to the invention.

FIG. 1 diagrammatically shows a partial cross section of a feed-processing system 1 according to the invention in the form of an autonomously self-propelled vehicle, comprising a container 2 with a storage space 3 on a chassis floor 4 with wheels 5 and a wheel drive (not shown).

Reference numeral 6 denotes a conveyor belt with a conveyor drive 7, for conveying partial feed piles 8-1, 8-2, 8-N(shown hatched). Plant 9 is cut using cutting beam 10 and gathered and raised by gathering and raising device 11, comprising an escalator belt 12, a raising drive 13 and a height sensor 14.

Reference numeral 15 denotes a removing and dosing device, comprising removing members 16, removing drives 17 and a dosing belt 18. Finally, reference numeral 19 denotes a control unit for the vehicle.

The feed-processing vehicle 1 is autonomously self-propelled, and to this end comprises features (not shown) which are known in the prior art, such as a GPS system or another navigation system. This may be part of the control unit 19 which can determine one or more routes for the vehicle.

In this exemplary embodiment, the vehicle 1 itself can collect plants 9, such as grass, alfalfa or the like. To this end, the control unit 19 drives the vehicle 1 to a location containing plants 9, following which the cutting beam 10 cuts the plants. The cut plants are then gathered by means of the gathering and raising device 11, and raised using the escalator belt 12 thereof which is driven by the raising drive 13.

Thus, in the storage space 3 of the container 2 a partial feed pile will be formed which will become higher and higher, until the height sensor 14 determines that the height of the partial pile has reached a limit. At that moment, the control unit connected to the conveyor drive 7 can control the latter so that the conveyor belt 6 moves in the direction of the arrow A. As a result, the partial feed pile will be moved to the back, that is to say away from the gathering and raising device 11. In this way, several partial feed piles 8-1, 8-2, ..., 8-N are formed during the cutting operation.

It is important for the control unit 19 to know when the storage space 3 is full of partial feed piles 8. After all, the cutting operation can then be stopped and the vehicle can drive to a location where the collected animal feed can be deposited. Therefore, there has to be a sensor which is able to determine if the rearmost partial feed pile 8-N, which was actually formed first, has reached the rear of the storage space 3, at least the dosing and removing device 15. There may also be other reasons to determine whether the rearmost partial feed pile has reached this position, for example if the storage space 3 is only partly filled, but removal, and optionally dosing out, already have to be started. After all, it is not sensible to have the drives 17 of the removing members 16 and the dosing belt 18 continuously operating to capacity, which would result in unnecessary wear and could even cause danger.

To this end, the vehicle 1 according to the invention assigns a second function to the removing device 15. Specifically, the control unit 19 operates the removing device 15 in a freewheeling mode for at least part of the time period during which animal feed is being collected and/or moved to the removing device 15. Such a freewheeling mode is characterized by operating the one or more removing members 16 slowly and at very low power, without operative contact with a partial feed pile 8. In the freewheeling mode, the control unit, at least a suitable sensor which is connected to the control unit 19, measures an operating parameter of the removal drive 17, such as the required current, the required power or the rotary speed. When the partial feed pile 8-N has come sufficiently close to the removing members 16, that is to say makes operative "contact" therewith, the value of the operating parameter will change as it becomes more difficult to rotate the removing members.

Then, the control unit 19 can stop the conveyor drive 7, for example because the partial feed pile 8-N is now situated against the removing device, but does not yet have to be removed therefrom or dosed out. This is the case, for example, if plants 9 have been collected which are to be dosed out elsewhere. However, it is also possible that the control unit 19 now causes the removal drive 17 to change to a removing mode, leading to an increase in the power supplied and/or the rotary speed. Alternatively, for example, it would also be possible for the torque supplied or the like to increase. In this case, the removal drive is designed as an electric motor, but it could also have a different design, such as hydraulic or via a power take-off or the like.

Removal and/or dosing out can take place at a location where removed animal feed is stored intermediately, such as in a feed kitchen. There, another system may compose, for example a mixed ration, such as TMR. Alternatively, the vehicle 1 may also dose out the animal feed for cattle, such as at a feed fence, by means of the removing and dosing device 15. Specifically, to this end the dosing belt 18 will be operated which collects the removed/separated animal feed from the removing members 16 and can dispense it on the side of the vehicle 1.

It should be noted that it is also possible, instead of cutting and gathering plants 9, to fill the storage space 3 of the vehicle 1 with one or more bales of animal feed or the like, which can then be positioned in the same way by the conveyor belt 6, after which the removing device 15 can separate this animal feed and can, if desired, dose it out by means of the likewise optional dosing belt 18.

FIG. 2 diagrammatically shows an exemplary diagram of the rotary speed as a function of time, in arbitrary units.

The drawn line shows the freewheeling mode in which a constant and low rotary speed is maintained for the removing member(s). At instant T, when the animal feed makes operative contact with the removing members, the rotary speed drops and this consequently makes driving more difficult. The control unit can then choose to bring the removing members to a standstill, indicated as an option by the dashed line with a rotary speed zero after instant T. This may be useful, for example, if the animal feed does not yet have to be removed, but filling the feed-processing system has to be stopped, for example. Another option is shown by means of a dash-dotted line, and indicates that the control unit moves the removing device correctly to a removing mode, in which the rotary speed is greatly increased. However, other control units or settings are also possible.

FIG. 3 diagrammatically shows a side view of an alternative feed-processing system 20 according to the invention. Here, and in the entire drawing, similar parts are denoted by the same reference numerals, except for one or more accents.

The system 20 comprises a container 2' with a supply device 21 for supplying a block of animal feed 22 on a conveyor belt 6'. Reference numeral 17' denotes a removing device, reference numeral 19' a control unit and reference numeral 23 a feed-collecting trolley.

The system 20 is a system which is securely fixed with respect to the outside world, but in this case the conveyor belt 6' ensures that the animal feed 22 is moved, which in this case is a block or bale of animal feed. Obviously, it is also possible to move animal feed which is in a different shape and which is first transferred to the belt by means of the supply device 21. The container 2' is illustrated as a slanting box in order to make it possible to empty it out into the trolley 23 (by positioning the latter underneath), but could also be designed as a horizontal container, in which for example use may be made of a difference in height between the container 2' and the location or floor for the trolley 23.

The control unit 19' controls the drive (not shown) of the conveyor belt 6' and allows the removing device 17' to rotate in a freewheeling position during transport. In this case, the control unit measures an operating parameter of the drive of the removing device 17' by means of a suitable sensor, such as a motor current or rotary speed. If the value of the operating parameter changes to a sufficient degree, the control unit 19' will decide contact between the supplied animal feed 22 and the removing device 17' has taken place, after which, for example, the belt 6' is stopped or the removing device is set to a removing mode, with higher power consumption and/or rotary speed. In the latter case, the system 20 may dispense, for example, removed/separated animal feed to the feed-collecting trolley 23 which may take the collected released animal feed further to a desired location, such as a feed fence.

FIG. 4 diagrammatically shows a side view of yet another alternative feed-processing system according to the invention, in the form of vehicle 1". The vehicle 1" is provided with a container 2" and driven wheels 5", as well as a removing member 16" and a removal drive 17", and a control unit 19". Reference numeral 30 denotes a pit containing silage.

Again, vehicle 1" is autonomously self-propelled, although it could also be designed as a trailer behind a tractor or the like, or as a vehicle driven by a driver. In the illustrated embodiment, the vehicle 1" drives autonomously to the pit 30, under the control of the control unit 19". In order to know when vehicle 1" has to be stopped, the control unit 19" allows the drive 17" to rotate the removing member 16" in a freewheeling mode, at low power and/or rotary speed. In addition, an operating parameter of the drive 17" is measured. If the latter changes to a sufficient degree, the control unit 19" decides that "contact" has taken place and knows that the vehicle 1", at least the removing member 16", is in operative contact with the pit 30. The control unit 19" can then put the removal drive 17" in a removing mode, so that the removing member 16" can remove a part of the pit 30 at higher power and/or rotary speed and tip it into the container 2". Thereafter, the control unit 19" can send the trolley 1" to another destination.

The invention is not limited to the embodiments described and/or shown. Rather, the scope of protection is determined by the attached claims.

The invention claimed is:

1. A feed-processing system for processing animal feed, comprising:
   a feed storage bin for storing a pile of animal feed;
   a remover for releasing an amount of animal feed from the pile of animal feed in the feed storage bin, the remover comprising a rotatable removing member and a first drive for the rotatable removing member;
   a displacer with a second drive, the displacer configured to move the remover and the pile of animal feed towards each other;
   a sensor for detecting a first sensor signal; and
   a control unit configured to control the feed-processing system,
   wherein the control unit is configured to cause the first drive to drive the rotatable removing member in a freewheeling mode during at least a part of the movement of the remover and the pile of animal feed towards each other, wherein the rotatable removing member is not in any operative contact with the pile of animal feed,
   wherein the sensor measures the first sensor signal relating to a first operating parameter of the first drive,
   wherein the control unit is configured to:
      detect whether the rotatable removing member and the pile of animal feed are in contact on the basis of the first sensor signal;
      control the feed-processing system, partly on the basis of whether or not contact is detected; and
      cause the first drive to drive the rotatable removing member in a removing mode when the control unit has detected said contact, wherein the rotatable removing member releases animal feed and removes it from the pile of animal feed, and wherein the first drive operates at a higher rotary speed and/or power than in the freewheeling mode,
   wherein the feed storage bin comprises a storage floor in a fixed position with respect to the outside world,
   wherein the remover comprises a displaceable vehicle which carries the rotatable removing member, and
   wherein the vehicle is autonomously self-propelled.

2. The feed-processing system according to claim 1, wherein the control unit is configured to detect contact if the first operating parameter reaches or exceeds a predetermined contact threshold value.

3. The feed-processing system according to claim 1, wherein the first drive comprises an electric motor or a hydraulic drive.

4. The feed-processing system according to claim 1, wherein the first operating parameter comprises a consumed current, a power, a rotary speed or a produced torque of the first drive of the rotatable removing member.

5. The feed-processing system according to claim 1, wherein said control of the feed-processing system comprises the control of the second drive when the control unit detects said contact.

6. The feed-processing system according to claim 1, wherein the control unit controls the first drive in the removing mode by the first sensor signal and a second sensor signal relating to a second operating parameter.

7. The feed-processing system according to claim 1, wherein the remover is fixedly arranged and the displacer is configured to move the pile of animal feed in the feed storage bin towards the remover, and the displacer comprises a movable loading floor or a floor chain.

8. The feed-processing system according to claim 1, wherein the feed-processing system comprises a vehicle on which both the feed storage bin and the remover are provided.

9. The feed-processing system according to claim 1, wherein the remover is a defacer or unloading roller.

10. The feed-processing system according to claim 1, further comprising:
   a cutter for cutting plants on the field; and
   a gatherer for gathering the cut plants and passing the cut plants to the feed storage bin.

11. The feed-processing system according to claim 10, further comprising a doser for dosing out the feed and/or the cut plants to animals.

12. The feed-processing system according to claim 10, wherein the remover doses out the feed and/or the cut plants to animals.

13. The feed-processing system according to claim 2, wherein the first drive comprises an electric motor or a hydraulic drive.

14. The feed-processing system according to claim 2, wherein the first operating parameter comprises a consumed current, a power, a rotary speed or a produced torque of the first drive of the rotatable removing member.

15. The feed-processing system according to claim 2, wherein said control of the feed-processing system comprises the control, in particular stopping, of the second drive when the control unit detects said contact.

16. The feed-processing system according to claim 3, wherein the first operating parameter comprises a consumed current, a power, a rotary speed or a produced torque of the first drive of the rotatable removing member.

* * * * *